United States Patent [19]

Koppers et al.

[11] Patent Number: 4,843,886
[45] Date of Patent: Jul. 4, 1989

[54] PRESSURE MEASURING DEVICE

[75] Inventors: Manfred Koppers, Duisburg; Lothar Sebastian, Bochum; Kuno Guse, Dortmund, all of Fed. Rep. of Germany

[73] Assignee: Bochumer Eisenhütte Heinzmann GmbH & Co., KG, Bochum, Fed. Rep. of Germany

[21] Appl. No.: 193,241

[22] Filed: May 11, 1988

[30] Foreign Application Priority Data

Jun. 19, 1987 [DE] Fed. Rep. of Germany ....... 3720373

[51] Int. Cl.$^4$ ............................ G01L 9/14; G01L 7/10
[52] U.S. Cl. ......................................... 73/728; 73/729; 338/32 H
[58] Field of Search ............... 338/32 H; 73/731, 738, 73/722, 725, 729, 728

[56] References Cited

U.S. PATENT DOCUMENTS

| | | | |
|---|---|---|---|
| 1,422,256 | 7/1922 | Conrad et al. | 73/146.8 |
| 1,744,590 | 1/1930 | Sutherland | 73/146.8 |
| 4,006,402 | 2/1977 | Mincuzzi | 73/722 |

FOREIGN PATENT DOCUMENTS 2600925 7/1977 Fed. Rep. of Germany .
3227516 9/1983 Fed. Rep. of Germany .
2954227 1/1987 Fed. Rep. of Germany .

Primary Examiner—Joseph A. Orsino
Assistant Examiner—Hollis Chen
Attorney, Agent, or Firm—Herbert Dubno

[57] ABSTRACT

The pressure measuring device has a housing in which a pressure chamber is located in a pin extending freely in the interior of the housing from a base. The pressure chamber wall is deformable elastically under an applied pressure. In the free end portion of the pin a magnetoresistive sensor is mounted which is moved with the chamber wall in a displacement occurring because of pressure changes in the chamber and thus is displaced relative to a permanent magnet. The magnet is mounted slightly transversely in the end portion of a compensating sleeve which surrounds the pin with wall contact. The change of the magnetic field at the sensor on displacement causes a proportional resistance change of the sensor so that an electrical signal proportional to the pressure change is generated which is a measure of the pressure. An amplifier for the signal from the magnetoresistive sensor can be mounted inside the housing adjacent the permanent magnet or the magnetoresistive sensor. Also advantageously the space between the housing and the compensating sleeve can be filled with insulation to further reduce temperature compensation requirements.

10 Claims, 2 Drawing Sheets

PRESSURE MEASURING DEVICE

FIELD OF THE INVENTION

Our present invention relates to a pressure gauge or a measuring device for the measurement of pressure.

BACKGROUND OF THE INVENTION

A pressure measuring device can have a housing and a cylindrical pressure chamber extending from a base freely through the housing. A portion of a pressure chamber wall running parallel to the chamber axis is deformed elastically depending on the internal pressure in the chamber and the resulting deformation is detected by an analyzer or a computer as a measure of the pressure change by a measuring unit coupled with the pressure chamber wall.

Pressure measuring devices whose pressure sensors operate either mechanically, electromechanically or electronically with circuit contacts and/or without contacts are used to measure the static pressure of a fluid. Particularly when a high measurement accuracy is required and the data is needed for further processing in control or data acquisition, electromagnetic pressure sensors operating without contacts are used.

A pressure measuring device operating according to the strain-gauge principle is described in German Open Patent Application No. 26 00 925. This has a measuring tube whose inner space is acted on with a fluid whose pressure is to be measured. Strain gauge strips are cemented on the outside of the measuring tube and connected to a computer or analyzing device.

According to the applied pressure in the measuring tube, the tube together with the strain-gauge strips stretch to a greater or lesser extent. The resistance of the strain-gauge strips acts as a measuring signal.

This pressure measuring device operates very accurately but is very expensive since for one thing, considerable calibration effort and expense is required for balancing the strain-gauge strip bridge circuit to compensate the measuring sensor for temperature changes of the fluid whose pressure is being measured. For another thing, additional and expensive signal amplification for processing the measured signal is necessary.

A pressure measuring device described in German Open Patent Application No. 32 27 516 has a diaphragm displaceable by an applied pressure on which a permanent magnet is positioned. A magnetoresistive sensor is mounted on a housing opposite the permanent magnet. This pressure sensor is of course comparatively simple in structure but has the disadvantage that fluctuations of the surrounding temperature or the temperature of the medium to be measured influence the measurement results. The measurement precision of the pressure sensor is greatly limited.

A pressure measuring device as described in German Open Patent Application No. 29 54 227 has a folding bellows as a pressure sensor whose one end is attached to a coil core which is inserted into an electromagnetic coil to a depth which varies according to the expansion of the folding bellows.

The coil and folding bellows are mounted in a supporting plate.

The supporting plate, folding bellows, coil core and coil body in this device are made with materials chosen so that on varying the ambient temperature the thermal expansions of the individual components compensate each other. In this way this pressure measuring device operates independently of the ambient temperature with a constant precision.

Disadvantageously, however, the cost of the device is considerable, particularly because of the materials which must be used.

A pressure measuring unit for measurement of a high pressure according to the principles of this device is made only with difficulty and with unacceptably large costs. Another disadvantage is that the temperature compensation mechanism operates only for variations of the ambient temperature but not for variations of the temperature of the medium to be measured.

OBJECTS OF THE INVENTION

It is an object of our invention to provide an improved pressure measuring device which does not have the above mentioned disadvantages and difficulties.

It is also an object of our invention to provide an improved pressure measuring device which is simple and economical in structure and at the same time has a substantially temperature independent high measuring precision with reduced temperature compensation requirements.

SUMMARY OF THE INVENTION

These objects and others which will become more readily apparent hereinafter are attained in accordance with our invention in a pressure measuring device with a housing and a cylindrical pressure chamber extending from a base freely through the housing in which at least a portion of a pressure chamber wall running parallel to the chamber axis is deformed elastically depending on the internal pressure and the resulting deformation is supplied to an analyzer or a computer as a measure of the pressure change by a measuring unit coupled with the pressure chamber wall.

According to our invention the pressure chamber is received slidably with wall contact in a compensating sleeve extending freely in the housing over a substantial portion of its length. The compensating sleeve is made from a material with the same temperature response properties as that of the pressure chamber wall.

A magnetoresistive sensor is mounted in the vicinity of the free end portion of the pressure chamber or compensating sleeve a permanent magnet is attached to the free end portion of the pressure chamber or the compensating sleeve. The magnet is positioned with spacing opposite the magnetoresistive sensor approximately transversely to the axis of the pressure chamber.

Such a pressure measuring device offers considerable advantages in comparison to those which are known. Particularly it has a high measuring precision with comparatively economical components having a simple structure. An expensive compensation, for example as is required with a strain-gauge strip bridge circuit, is not required since only magnet and sensor must be positioned relative to each other which in practice can be effected quickly and simply by adjustment of the spacing of both components.

To guarantee that the temperature fluctuations of the fluid and/or surroundings have no influence on the measured results, the permanent magnet or the sensor is mounted on a compensating sleeve which surrounds the heat conducting pressure chamber wall. Since the materials of the pressure chamber wall and compensating sleeve are approximately the same as far as thermal properties, the pressure chamber wall and the compensating sleeve experience the same temperature conditions or have the same temperature history. A heating of the pressure chamber wall leads thus to a corresponding heating of the sleeve so that there is prevented a relative displacement between sensor and magnet because of thermal expansion.

Since sensor and permanent magnet react only to an axial component of the expansion of the pressure chamber wall and the compensating sleeve, the spacing once preset in the protection of the housing no longer changes, which is particularly important in regard to the accuracy.

In the pressure measuring device according to our invention, the magnetoresistive sensor can be associated with either the pressure chamber or the compensating sleeve; the magnet is then associated with the compensating sleeve or the pressure chamber. The magnetoresistive sensor and its spacing from the magnet are so selected that the measuring range of the pressure measuring device is within the linear characteristic region of the sensor.

The free end portion of the pressure chamber can advantageously have a considerably larger thickness compared to the thickness of the wall and is provided with an axial protruding member which projects into a cavity adjacent the free end portion of the sleeve. Thereby the protruding member and/or the sleeve end portion forms the support or carrier of the sensor and/or the permanent magnet.

The thickened end portion of the pressure chamber guarantees that it is not deformed under a high pressure into an uncertain size or shape and thus that it does not have a deleterious effect on the measurement. In one embodiment, the sensor is associated with the protruding member and the magnet is inserted displacably and securably in a transverse hole in the sleeve.

In another feature of our invention the spacing between the sensor and the permanent magnet is adjustable so that it can be fixed exactly in a simple way.

To still further compensate for the temperature sensitivity of the chamber wall and the compensation sleeve, the gap between the wall and the compensating sleeve is filled with a thermally conductive means, advantageously a thermally conductive paste.

In one particular embodiment which very efficaciously embodies the concepts of our invention, the housing has a cylindrical outer casing, and base and a cap are both mountable on it.

A connecting passage to the pressure chamber can be provided in the base and the connecting wire or wires of the sensor can be fed from the cap. Thus the housing comprises two stable substantially rigid end pieces, the base and the cap, which are connected with each other by a cylindrical outer casing. The base has the connecting passage for the pressure chamber. The pressure chamber and the compensating sleeve are attached. The connecting leads for the sensor can be fed out from the cap. Enough space is provided inside the cap so that a signal amplifier can be provided inside the cap adjacent the sessor. The entire measuring mechanism is protected by the stable cylindrical outer casing in this embodiment. In this way a hermetically sealed unit is formed which is insensitive to outside influences of any kind.

All components can be detachably connected with each other. Understandably however it is possible to permanently form together one or another component.

When the space between the compensating sleeve and the housing casing is filled with an insulating means, the influence of exterior conditions on the temperature sensitivity of the chamber wall and the compensating sleeve is still further reduced. Mineral wool for example can be used as an insulating means.

BRIEF DESCRIPTION OF THE DRAWINGS

The above and other objects, features and advantages of our invention will become more readily apparent from the following description, reference being made to the accompanying highly diagrammatic drawing in which.

SPECIFIC DESCRIPTION

Figure 1:
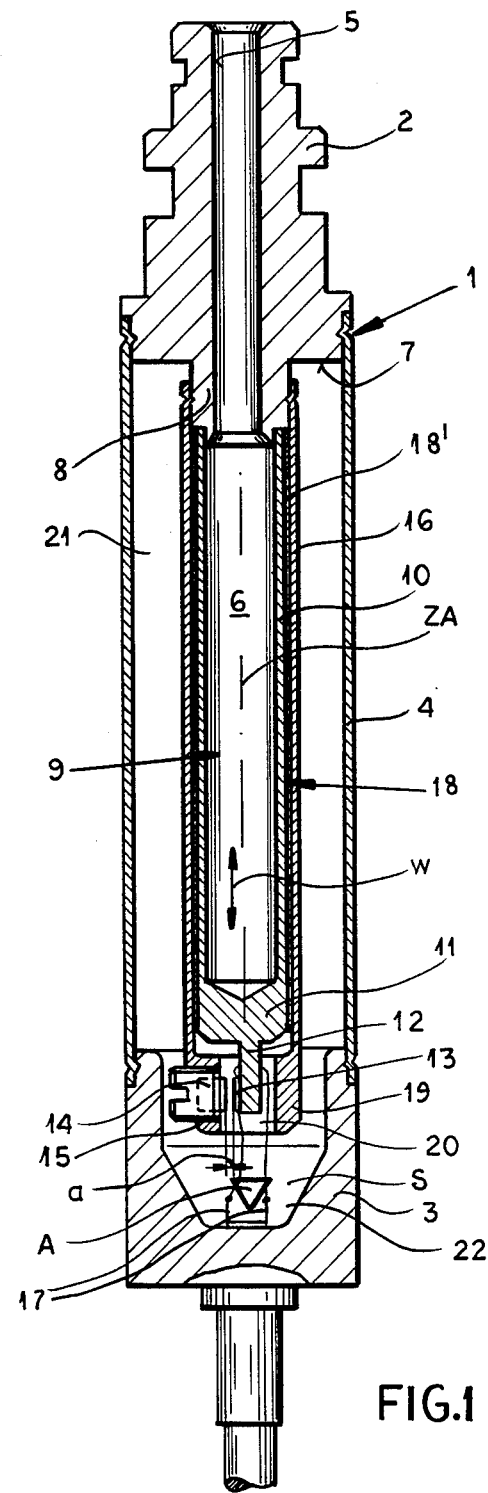
FIG. 1 is a longitudinal cross sectional view through one embodiment of a pressure measuring device according to our invention.

The pressure measuring device shown in the drawing has a housing 1 which comprises a base 2, a cap 3 and a cylindrical outer casing 4 connecting the base 2 with the cap 3. The housing 1 forms a stable structural unit which protects the components located in it from outside influences.

The base 2 acts as a connector to an unshown fluid pipe. The pressure of the fluid is measured by the pressure measuring device. The base 2 has a central passage 5 which connects the unshown fluid pipe with a pressure chamber 6. The pressure chamber 6 forms a part of a pin 9 which is attached at one end to a central projection 8 which protrudes from the front end 7 of the base 2. The other free end portion 11 of the pin 9 extends freely into a space 21 surrounded by the outer casing 4.

The pin 9 extends centrally into the housing 1 from the base 2 until in a socket or receptacle 22 of the cap 3. It is made of an elastically deformable material and is designed so that it stretches out in the vicinity of the chamber wall 10 when pressure acts on the pressurized chamber 6.

The other end portion 11 of the pin 9 facing the cap 3 is made thicker so that it is rigid compared to the pressure chamber wall 10.

A protruding member 12 directed toward the cap 3 is molded on the free end portion 11. The protruding member 12 is located inside of the cylindrical outer contour of the pin 9 and a magnetoresistive sensor 13 is mounted on its one flat side.

This sensor 13 is spaced a distance a from a permanent magnet 14 which is positioned slidably in a transverse hole 15 in the thickened free end portion 19 of a compensating sleeve 16. The transverse hole 15 has a thread. The permanent magnet 14 is positioned inside a screw or is built like a screw so that it is positionable or adjustable over the distance a to the magnetoresistive sensor 13.

Figure 2:
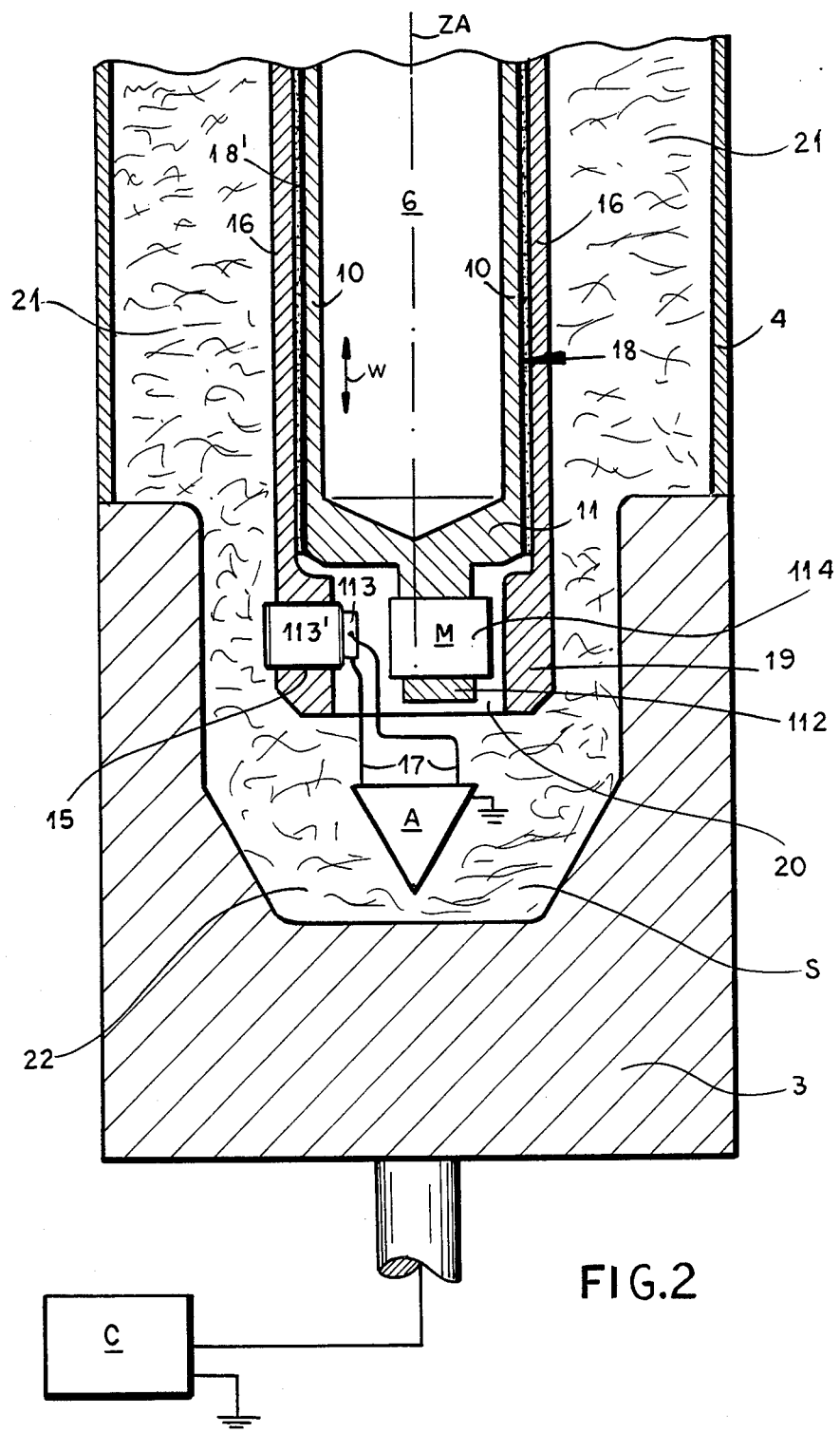
FIG. 2 is an enlarged longitudinal cross sectional view through another embodiment of a pressure measuring device according to our invention, partly broken away.

The compensating sleeve 16 is positioned concentric to the axis ZA of the pin 9 with indirect wall contact with the pin 9 and likewise is attached to the central projection 8. The gap 18 between the pressure chamber wall 10 and the compensating sleeve 16 can be filled with a heat conducting means 18', e.g. with a thermally conductive paste (FIG.2).

The compensating sleeve 16 is made from the same material as the pressure chamber wall 10 or from a material having similar temperature response properties (thermal coefficient of expansion) so that the compensating sleeve 16 and the chamber wall 10 expand on heating about the same amount. Hence, the pressure chamber provides constant measurement results at different working temperatures and also when there is a temperature difference between the pressure chamber and the surroundings.

The compensating sleeve 16 extends into the socket 22 of the cap 3 without contacting it.

The cap 3 has a lead cable through which the connecting wires 17 for the magnetoresistive sensor 13 are fed out from the housing 1. With an appropriately spacious structure for the cap a signal amplifier A can also be located in the interior space S.

The operation of the pressure measuring device according to our invention is as follows:

When pressure is applied through the passage 5 the cylindrical wall 10 of the pressure chamber 6 located in the pin 9 stretches out according to the magnitude of the pressure whereby the protruding member 12 with the sensor 13 located on it is displaced in the direction w relative to the permanent magnet 14. The spacing a between the magnet 14 and the sensor 13 remains constant however. Correspondingly the produced magnetic field change alters the resistance of the sensor 13 and of course approximately proportionally to the displacement. Hence, the electrical signal produced is proportional to the pressure change and is then a measure of the pressure. This electrical signal is then fed to an analyzer or computer C.

The magnetoresistive sensor 13 and the magnet 14 are located in the free end portions 11, 12 and/or 19 of the pin 9 and the compensating sleeve 16 which are of course comparatively rigid so that an exact and reproducible measurement result is obtained. The entire device for pressure measurement is protected by the housing 1 so that the pressure measuring device is also usable where a high exterior load exists, e.g. in underground digging operations.

By suitable selection of materials and construction this pressure measuring device can fit nearly all conditions of pressure. The measurement can be effected by displacement of the magnet 14 relative to the sensor 13 in direction w (as in the present example). Alternatively the measurement can be effected by changing the spacing a. Then an adjusting or justifying device for alignment of the magnet 14 in the direction w is required (this corresponds to a rotation of about 90° around the measurement direction in which the pin 9, compensating sleeve 16 and the housing 1 remain unchanged).

Another embodiment of the pressure measuring device is shown in FIG. 2. In this embodiment the magnet 114 is mounted on the protruding member 112 and is fixed in position. The sensor 113 I/O is slidably mounted substantially transverse to the axis ZA on a carriage 113'. Also in this case an amplifier A for amplification of the signal from the sensor 113 is provided as well as a computer C for receiving and analyzing the pressure dependent signal from the amplifier. A single lead is shown because a ground is indicated. All other parts of this pressure measuring device are the same as in the previous embodiment and those parts which are the same have been indicated with the same reference characters. However, a glass wool insulator here fills the space 21.

By "measuring unit" we mean the magnetoresistive sensor 13, the permanent magnet 14 and the amplifier A and other components necessary to convert the change in pressure into a change in electrical signal.

We claim:

1. A pressure measuring device for measuring pressure, especially for measurement of a high pressure, comprising:
   a housing having a base;
   a cylindrical pressure chamber extending from said base freely through said housing in which at least a portion of a pressure chamber wall running parallel to an axis of said pressure chamber is deformed elastically depending on the internal pressure in said pressure chamber;
   a compensating sleeve in which said pressure chamber is received slidably extending freely in said housing over a substantial portion of a length of said housing, said compensating sleeve being made from a material with the same temperature response properties as that of said pressure chamber wall;
   a magnetoresistive sensor mounted in a vicinity of a free end portion of said pressure chamber or said compensating sleeve;
   a permanent magnet attached to said free end portion of said pressure chamber or said compensating sleeve mounted opposite said magnetoresistive sensor approximately transversely to said axis of said pressure chamber, spacing between said sensor and said permanent magnet being adjustable;
   an analyzer or a computer for receiving a signal from said magnetoresistive sensor, said signal being proportional to said internal pressure in said pressure chamber.

2. The improvement according to claim 1 wherein said free end portion of said pressure chamber has a considerably larger thickness in comparison to the thickness of said pressure chamber wall and is provided with an axial protruding member which extends into a cavity of said free end portion of said compensating sleeve, said protruding member and/or said free end portion of said compensating sleeve comprising a carrier or support for said magnetoresistive sensor and/or said permanent magnet.

3. The improvement according to claim 1 wherein said spacing between said sensor and said permanent magnet is adjustable.

4. The improvement according to claim 1 wherein a gap between said pressure chamber wall and said compensating sleeve is filled with a heat conducting means.

5. The improvement according to claim 4 wherein said heat conducting means is a thermally conductive paste.

6. The improvement according to claim 1 wherein said housing has a cylindrical outer casing with said base and a cap which are both mountable thereon, a connecting passage to said pressure chamber being provided in said base and at least one connecting wire for said sensors fed from said cap.

7. The improvement according to claim 1 wherein a signal amplifier for the signal from said sensor is located inside of said housing.

8. The improvement according to claim 1 wherein the space between said compensating sleeve and said housing casing is filled with an insulating means.

9. A pressure measuring device for measuring pressure, especially for measurement of a high pressure, comprising:

a housing having a substantially cylindrical outer casing with a base having a connecting passage for communication of said pressure and a cap attached to said cylindrical outer casing opposite said base;

a cylindrical pressure chamber connected with said connecting passage extending from said base freely through said housing in which at least a portion of a pressure chamber wall running parallel to the axis of said pressure chamber is deformed elastically depending on the internal pressure in said pressure chamber;

a compensating sleeve in which said pressure chamber is received slidably extending freely in said housing over a substantial portion of a length of said housing, said compensating sleeve being made from a material with the same temperature response properties as that of said pressure chamber wall;

a magnetoresistive sensor mounted in the vicinity of a free end portion of said pressure chamber or said compensating sleeve;

a permanent magnet attached to said free end portion of said pressure chamber or said compensating sleeve mounted opposite said magnetoresistive sensor approximately transversely to said axis of said pressure chamber, spacing between said sensor and said permanent magnet being adjustable;

a heat conducting means provided in a gap between said pressure chamber wall and said compensating sleeve;

a signal amplifier for a signal from said magnetoresistive sensor mounted inside of said housing; and an analyzer or a computer for receiving said signal after amplification.

10. A pressure measuring device according to claim 9 in which said free end portion of said pressure chamber has a considerably larger thickness than the thickness of said pressure chamber wall and is provided with an axial protruding member which extends into a cavity of said free end portion of said compensating sleeve, said protruding member and/or said free end portion comprising a carrier or support for said magnetoresistive sensor and/or said permanent magnet and the space between said compensating sleeve and said housing casing is filled with an insulating means.

* * * * *